(12) United States Patent
Huang et al.

(10) Patent No.: US 9,197,724 B2
(45) Date of Patent: Nov. 24, 2015

(54) WIRE ARRANGEMENT STRUCTURE AND ELECTRONIC DEVICE USING THE SAME

(71) Applicant: Chi Mei Communication Systems, Inc., New Taipei (TW)

(72) Inventors: Chun-Ta Huang, New Taipei (TW); Kuan-Chung Shih, New Taipei (TW); Chin-Yu Hsu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/903,537

(22) Filed: May 28, 2013

(65) Prior Publication Data

US 2013/0331154 A1 Dec. 12, 2013

(30) Foreign Application Priority Data

Jun. 6, 2012 (TW) .............................. 101120356 A

(51) Int. Cl.
*H04M 1/02* (2006.01)

(52) U.S. Cl.
CPC .......... *H04M 1/0235* (2013.01); *H04M 1/0274* (2013.01)

(58) Field of Classification Search
CPC .......................... H04M 1/0235; H04M 1/0274
USPC ......... 361/810, 759; 455/575.3, 575.4, 575.1, 455/90.3
See application file for complete search history.

(56) References Cited

U.S. PATENT DOCUMENTS

| 8,594,752 | B2 * | 11/2013 | Kim et al. | 455/575.3 |
| 2010/0323769 | A1 * | 12/2010 | Peng et al. | 455/575.4 |
| 2012/0062441 | A1 * | 3/2012 | Peiker | 343/912 |
| 2013/0225248 | A1 * | 8/2013 | Takagi | 455/575.3 |

* cited by examiner

*Primary Examiner* — Michael Mapa
*Assistant Examiner* — Tanisha Jackson
(74) *Attorney, Agent, or Firm* — Novak Druce Connolly Bove + Quigg LLP

(57) ABSTRACT

A wire arrangement structure includes a first fixed rod, a second fixed rod, a movable rod, a wire, and an elastic member. The elastic member is connected to the movable rod. When the second fixed rod slides relative to the first fixed rod, the elastic member provides a force to move the movable rod to adjust the length of the wire.

8 Claims, 6 Drawing Sheets

WIRE ARRANGEMENT STRUCTURE AND ELECTRONIC DEVICE USING THE SAME

BACKGROUND

1. Technical Field

The present disclosure generally relates to electronic devices, and particularly to a wire arrangement structure for a slide-type electronic device.

2. Description of Related Art

Portable electronic devices such as mobile phones, laptops, and personal digital assistants (PDAs) are widely used. A slide-type portable electronic device has two housings, of which one slides relative to the other via a slide mechanism to open/close the portable electronic device.

The slide-type portable electronic devices typically need a wire to electronically connect the two housings in spite of the open process or the closed process slide relative to each other. However, the wire is suspended in the two housings and is easily twisted or knotted.

Therefore, there is room for improvement within the art.

BRIEF DESCRIPTION OF THE DRAWINGS

Many aspects of the wire arrangement structure for electronic device can be better understood with reference to the following drawings. The components in the drawings are not necessarily to scale, the emphasis instead being placed upon clearly illustrating the wire arrangement structure for electronic device. Moreover, in the drawings, like reference numerals designate corresponding parts throughout the several views.

DETAILED DESCRIPTION

Figure 1:
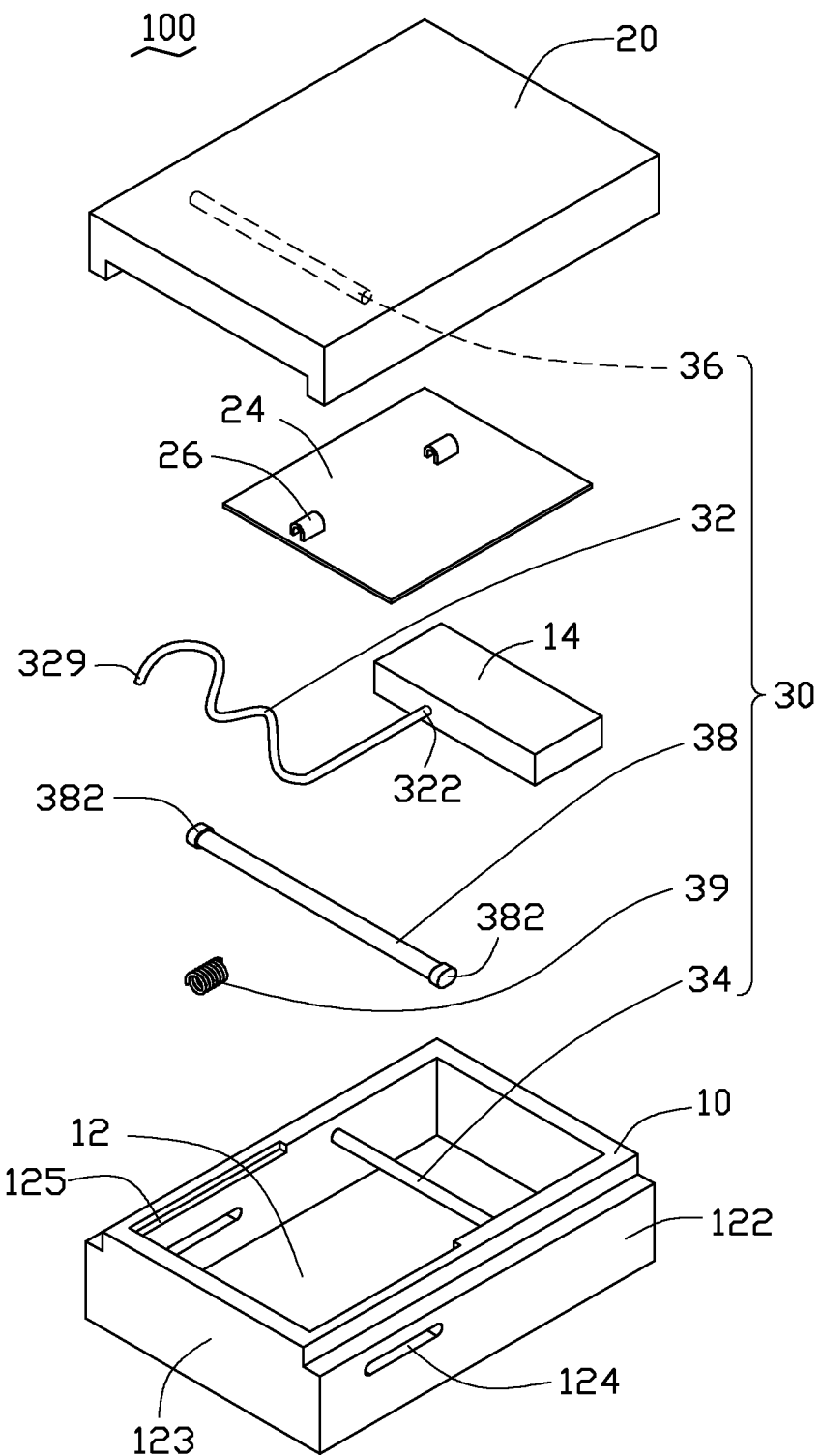
FIG. 1 is an exploded, isometric view of an electronic device using a wire arrangement structure according to an exemplary embodiment.
Figure 2:
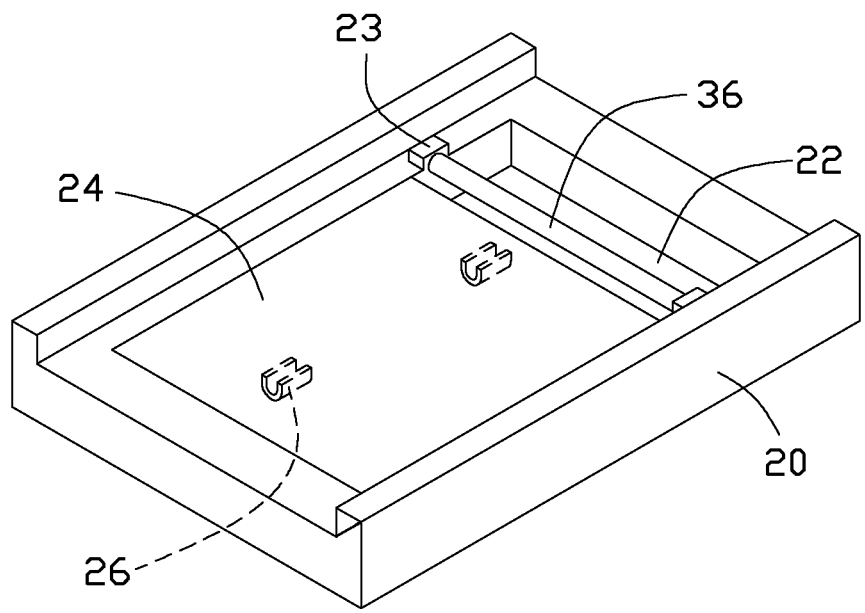
FIG. 2 is a schematic view of the second housing in FIG. 1, but shown from another angle.

FIG. 1 and FIG. 2 show an exemplary embodiment of a wire arrangement structure 30 applied in an electronic device 100, such as a mobile phone, or a personal digital assistant. The electronic device 100 includes a first housing 10 and a second housing 20. The wire arrangement structure 30 includes a wire 32, a first fixed rod 34, a second fixed rod 36, a movable rod 38, and an elastic member 39. In the closed orientation, the first housing 10 and the second housing 20 overlap each other. In the open orientation, the second housing 20 is slid parallel to and away from the first housing 10.

The first housing 10 defines a receiving cavity 12. Two opposite sidewalls 122 and two opposite end walls 123 define the receiving cavity 12. A printed circuit board (PCB) 14 is received in the receiving cavity 12. Each sidewall 122 defines a longitudinal through hole 124 and a guiding slot 125. The longitudinal through holes 124 are defined in side surfaces of the sidewalls 122. The guiding slots 125 are defined on a top surface of the sidewalls 122 and extend from one end of the sidewalls 122 to a middle of the sidewalls 122.

FIG. 2 shows the second housing 20 defining a groove 22. Two blocks 23 are positioned at opposite sides of the groove 22 for being slidably received in the guiding slots 125. A support plate 24 is received in the groove 22. The length of the support plate 24 is shorter than that of the groove 22. In this exemplary embodiment, the support plate 24 is made of iron. Two clasps 26 are mounted on the support plate 24 for receiving the wire 32.

The first fixed rod 34 crosses the receiving cavity 12, and opposite ends of the first fixed rod 34 are mounted on the two sidewalls 122. The second fixed rod 36 is positioned above the groove 22, and opposite ends of the second fixed rod 36 is mounted on the blocks 23 of the second housing 20. The movable rod 38 is slidably received in the through holes 124. The movable rod 38 has a flange 382 at each of two opposite ends. The flange 382 is used for preventing the movable rod 38 from separating from the through holes 124.

Figure 3:
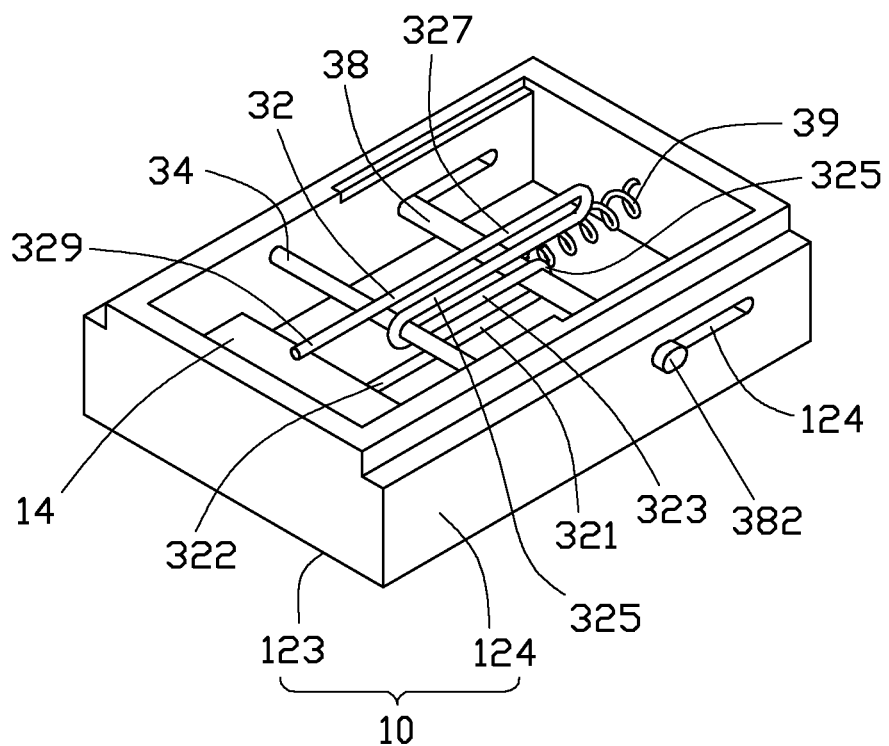
FIG. 3 is a partially assembled view of the electronic device of FIG. 1, omitting the second housing.

FIG. 3 shows that the wire 32 includes a first end 322 and a second end 329. The first end 322 of the wire 32 is electronically connected to the PCB 14 of the first housing 10. The second end 329 of the wire 32 is electronically connected to the second housing 20. When the wire 32 is wound between the first housing 10 and the second housing 20, the wire 32 is wound around the movable rod 38, the first fixed rod 34 and the second fixed rod 36 as described below. The movable rod 38, the first fixed rod 34, and the second fixed rod 36 are parallel to each other. The wire 32 is wound around the movable rod 38, the first fixed rod 34 and the second fixed rod 36 to form a first wire part 321, a second wire part 323, a third wire part 325, and a fourth wire part 327, all of which are parallel to each other and the lengths of each wire part varying depending upon the relative sliding positions of the first and second housings 10, 20. The first wire part 321 includes the first end 322 of the wire 32, which is connected to the PCB 14. The first wire part 321 extends in a first direction from its point of connection with the PCB 14 towards the movable rod 38. The second wire part 323 extends in a second direction, opposite to the first direction, from the movable rod 38 toward the first fixed rod 34. The transition between the first wire part 321 and the second wire part 323 is a portion of the wire 32 wound around the movable rod 38. The third wire part 325 extends in the first direction from the first fixed rod 34 toward the second fixed rod 36. The transition between the second wire part 323 and the third wire part 325 is a portion of the wire 32 wound around the first fixed rod 34. The fourth wire part 327 extends in the second direction from the second fixed rod 36 and includes the second end 329 of the wire 32, which is electronically connected to the second housing 20. The transition between the third wire part 325 and the fourth wire part 327 is a portion of the wire 32 wound around the second fixed rod 36.

The elastic member 39 is used for connecting the movable rod 38 to the first housing 10. One end of the elastic member 39 is mounted on one of the end walls 123, and another end of the elastic member 39 is mounted on the movable rod 38.

In assembly, the PCB 14 is received in the receiving cavity 12 of the first housing 10 and abuts against one end wall 123. The first fixed rod 34 crosses on the receiving cavity 12 and is mounted on the two sidewalls 122. The movable rod 38 is slidably received in the through holes 124 and is adjacent to another end wall 123. The elastic member 39 is mounted between the end wall 123 and the movable rod 38. A height of the first fixed rod 34 relative to a bottom surface of the receiving cavity 12 is higher than that of the movable rod 38. The support plate 24 is latched in the groove 22 of the second housing 20, and is spaced from an inner surface 24 of the groove 22. The second fixed rod 36 is mounted above the groove 22. A height of the second fixed rod 36 relative to a bottom surface of the receiving cavity 12 is higher than that of the first fixed rod 34. The wire 32 is firstly connected to the PCB 14 of the first housing 10 at the first end 322, then is wound around the movable rod 38, the first fixed rod 34 and the second fixed rod 36 to form the first wire part 321, the second wire part 323, the third wire part 325, and the fourth wire part 327, all of which are parallel to each other. Finally, the fourth wire part 327 extends to pass through the guiding clasps 26 to allow the second end 329 of the wire 32 to be mounted to the second housing 20. The blocks 23 are slidably received in the guiding slots 125 for guiding the second housing 20 to slide relative to the first housing 10. Accordingly, the wire arrangement structure 30 is assembled to the electronic device 100.

Figure 4:
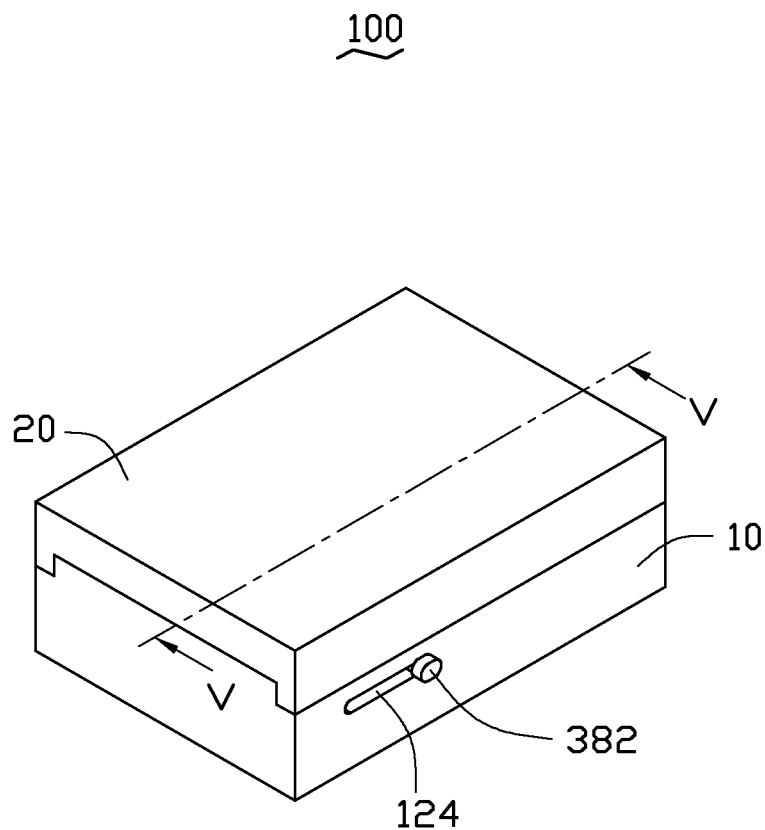
FIG. 4 is an assembled view of the electronic device of FIG. 1 in a closed orientation.
Figure 5:
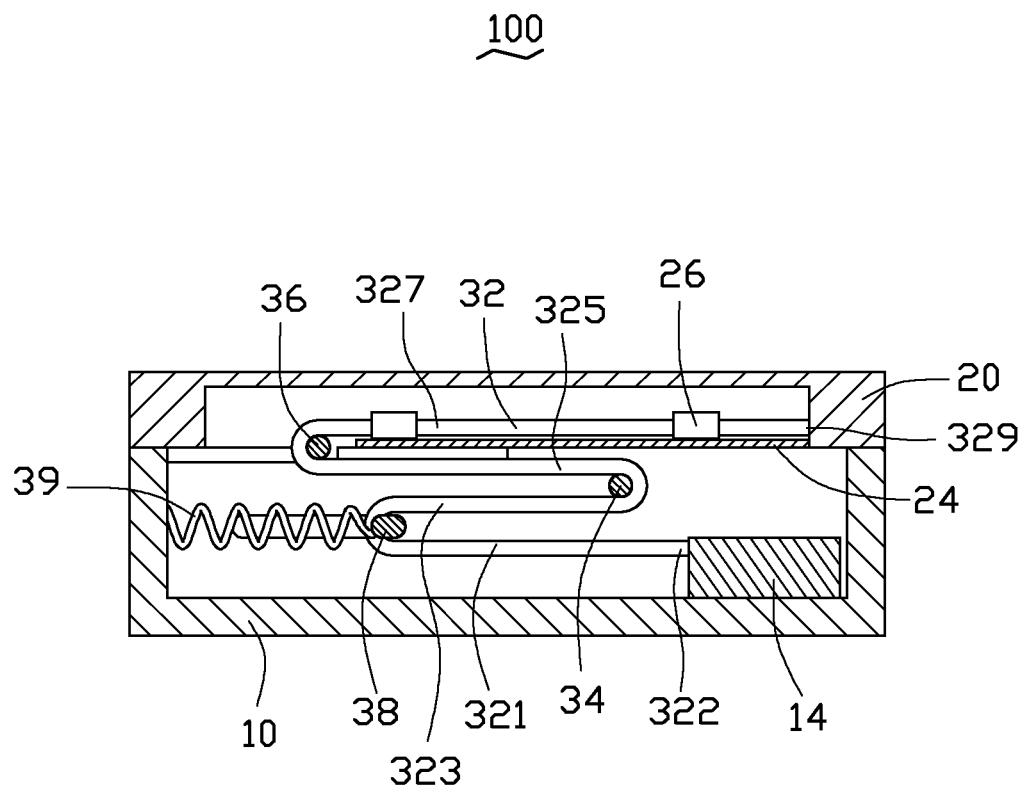
FIG. 5 is a cross sectional view of the electronic device of FIG. 4 in a close orientation.
Figure 6:
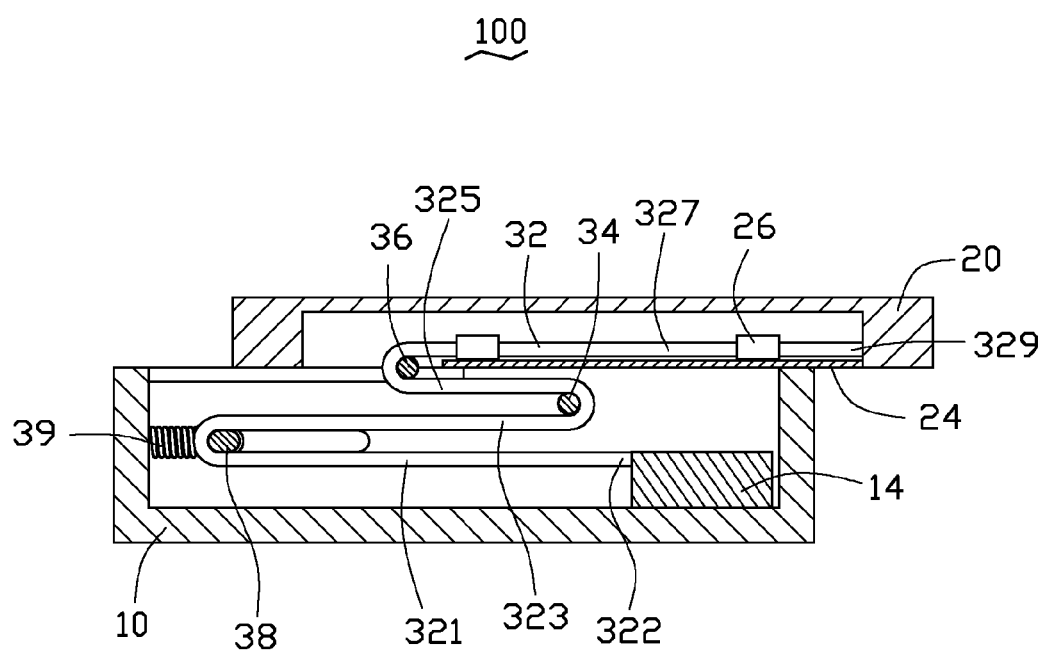
FIG. 6 is a cross sectional view of the electronic device of FIG. 4 in an open orientation.

FIGS. 4 to 6 show that when the first housing 10 is closed relative to the second housing 20, the elastic member 39 is at a stretched state. When the second housing 20 slides relative to the first housing 10, the second fixed rod 36 moves toward the first fixed rod 34 to shorten the distance therebetween. The movable rod 38 moves along the through holes 124 toward a direction away from the first fixed rod 34 and the second fixed rod 36 under the role of the elastic member 39. Thus, the movable rod 38 adjusts a length of the wire 32 between the first fixed rod 34 and the second fixed rod 36 and a length of the wire 32 between the movable rod 38 and the first fixed rod 34 for automatically arranging and tensioning the wire 32. The present wire 32 is tensioned and restricted among the first fixed rod 34, the second fixed rod 36, and the movable rod 38 and therefore cannot be easily twisted or knotted.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A wire arrangement structure applied to an electronic device, the wire arrangement structure comprising:
   a first fixed rod;
   a second fixed rod slidable relative to the first fixed rod;
   a movable rod slidable relative to the first fixed rod, wherein the electronic device comprises a first housing, the first housing defines a receiving cavity, the receiving cavity is defined by two opposite sidewalls and two opposite end walls, a height of the first fixed rod relative to a bottom surface of the receiving cavity is higher than that of the movable rod, and a height of the second fixed rod relative to the bottom surface of the receiving cavity is higher than that of the first fixed rod, the first fixed rod crosses the receiving cavity, and opposite ends of the first fixed rod are mounted on the two sidewalls;
   a wire including a first wire part, a second wire part, a third wire part, and a fourth wire part parallel to each other and formed by the wire being wound around the first and second fixed rods and the movable rod; and
   an elastic member connected to the movable rod and configured to provide a force, wherein the force pulls the wire through the movable rod and pulls each one of the first wire part, the second wire part, the third wire part, and the fourth wire part straight;
   wherein when the second fixed rod slides relative to the first fixed rod, the force moves the movable rod to adjust the lengths of wire between the first wire part, the second wire part, the third wire part, and the fourth wire part so that a lengthening of one of the wire parts is compensated by a shortening of another one of the wire parts.

2. The wire arrangement structure as claimed in claim 1, wherein the first wire part extends in a first direction towards the movable rod, the second wire part extends in a second direction, opposite to the first direction, from the movable rod toward the first fixed rod, the third wire part extends in the first direction from the first fixed rod toward the second fixed rod, the fourth wire part extends in the second direction from the second fixed rod.

3. An electronic device comprising:
   a first housing defining a receiving cavity, wherein the receiving cavity is defined by two opposite sidewalls and two opposite end walls;
   a second housing; and
   a wire arrangement structure comprising:
      a first fixed rod crossing the receiving cavity and opposite ends of the first fixed rod mounted on the two sidewalls;
      a second fixed rod mounted on the second housing;
      a movable rod slidably engaged with the second housing, wherein a height of the first fixed rod relative to a bottom surface of the receiving cavity is higher than that of the movable rod, and a height of the second fixed rod relative to the bottom surface of the receiving cavity is higher than that of the first fixed rod;
      a wire electronically connected to the first housing and the second housing, and being wound around the first fixed rod, the second fixed rod and the movable rod, the wire including a first wire part, a second wire part, a third wire part, and a fourth wire part, all of which are parallel to each other and formed by the wire being wound around the first and second fixed rods and the movable rod; and
      an elastic member connected to the movable rod and configured to provide a force, wherein the force pulls the wire through the movable rod and pulls each one of the first wire part, the second wire part, the third wire part, and the fourth wire part straight;
   wherein when the second fixed rod slides relative to the first fixed rod, the force moves the movable rod to adjust the lengths of the first wire part, the second wire part, the third wire part, and the fourth wire part of the wire so that a lengthening of one of the wire parts is compensated by a shortening of another one of the wire parts.

4. The electronic device as claimed in claim 3, wherein the first wire part extends in a first direction towards the movable rod, the second wire part extends in a second direction, opposite to the first direction, from the movable rod toward the first fixed rod, the third wire part extends in the first direction from the first fixed rod toward the second fixed rod, the fourth wire part extends in the second direction from the second fixed rod.

5. The electronic device as claimed in claim 3, wherein each sidewall has a longitudinal through hole defined in a side surface, and the movable rod is slidably received in the through holes.

6. The electronic device as claimed in claim 5, wherein each sidewall has a guiding slot defined on a top surface and extending from one end of the sidewall to a middle of the sidewall, the second housing has a groove and two blocks positioned at opposite sides of the groove for slidably being received in the guiding slots, the second fixed rod is positioned above the groove.

7. The electronic device as claimed in claim 6, wherein the second housing includes a support plate received in the groove, a length of the support plate is shorter than that of the groove, and two clasps are mounted on the support plate.

8. A wire arrangement structure applied to an electronic device, the wire arrangement structure comprising:
- a base defining a receiving cavity and a longitudinal through hole at each of opposite sides of the receiving cavity, wherein the receiving cavity is defined by two opposite sidewalls and two opposite end walls;
- a first fixed rod crossing the receiving cavity and opposite ends of the first fixed rod mounted on the two sidewalls;
- a second fixed rod slidably relative to the first fixed rod;
- a movable rod slidably received in the longitudinal through holes, wherein a height of the first fixed rod relative to a bottom surface of the receiving cavity is higher than that of the movable rod, and a height of the second fixed rod relative to the bottom surface of the receiving cavity is higher than that of the first fixed rod;
- a wire being wound around the movable rod, the first fixed rod and the second fixed rod, and including a first wire part, a second wire part, a third wire part, and a fourth wire part; and
- an elastic member connected to the movable rod and configured to provide a force, wherein the force pulls the wire through the movable rod and pulls each one of the first wire part, the second wire part, the third wire part, and the fourth wire part straight;
- wherein when the second fixed rod slides relative to the first fixed rod, the force moves the movable rod to adjust the lengths of the first wire part, the second wire part, the third wire part, and the fourth wire part so that a lengthening of one of the wire parts is compensated by a shortening of another one of the wire parts.

* * * * *